UNITED STATES PATENT OFFICE.

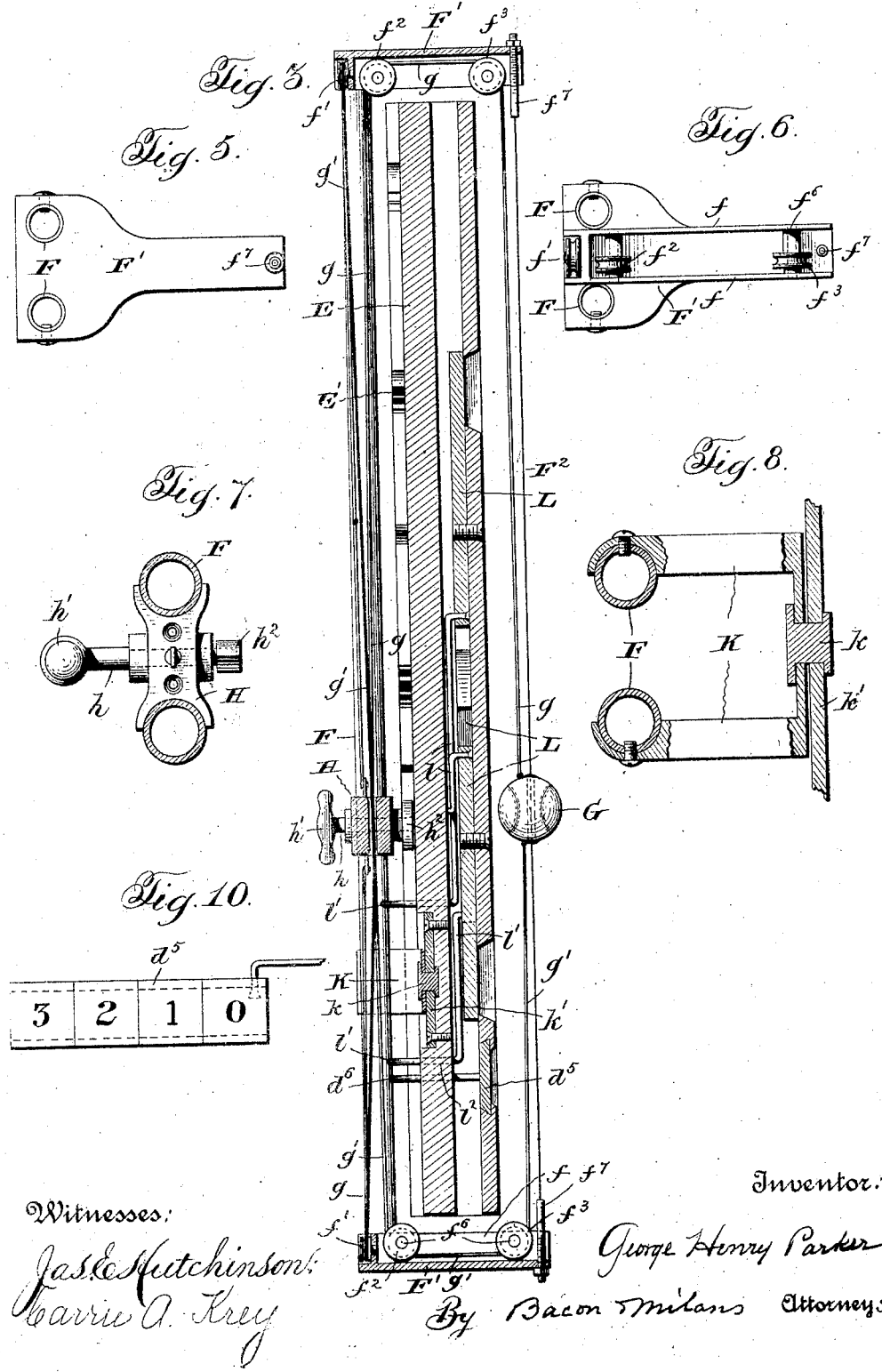

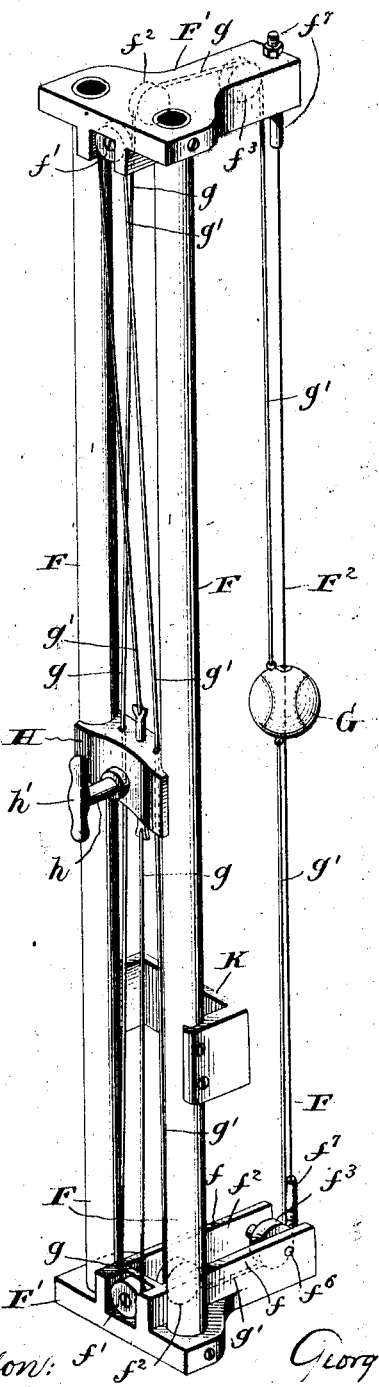

GEORGE HENRY PARKER, OF NEWARK, NEW JERSEY, ASSIGNOR, BY MESNE ASSIGN-
MENTS, TO MABEL CRANE BAKER, OF STAMFORD, CONNECTICUT.

BASE-BALL-BULLETIN BOARD.

1,043,536.  Specification of Letters Patent.  Patented Nov. 5, 1912.

Application filed August 14, 1908. Serial No. 448,530.

*To all whom it may concern:*

Be it known that I, GEORGE HENRY PAR-
KER, a citizen of the United States, residing
at Newark, in the county of Essex and State
of New Jersey, have invented certain new
and useful Improvements in Base-Ball-Bul-
letin Boards, of which the following is a
specification, reference being had therein to
the accompanying drawing.

This invention relates to an improvement
in base ball bulletins and is embodied in the
construction shown, described and defined
in the claims.

It is, at the present time, somewhat usual
at newspaper offices and public places to
display in a conspicuous place boards or bul-
letins indicating the progressive results of
pending base ball games, and various sug-
gestions have been made with the view of
indicating somewhat minutely the different
plays as they are made, the knowledge of
which being transmitted by telephone or by
telegraph to the proprietor of the exhibition
device.

My invention relates particularly to this
character of device and is designed to dis-
play, by means of a ball or other object,
preferably a ball, the position of the ball
during the progress of the game.

The invention is also designed to indicate
the position of the players during the prog-
ress of the game.

The board or bulletin is also provided
with means for indicating the various plays,
such as occur during the ball game; the
score, strikes, balls, and the final results.

Primarily, the device is intended to be op-
erated from the rear, and one of the prin-
cipal objects of the invention is to enable
the operator to properly position the ball
at the front according to its position at each
play during the game, and so progressively.

While in the accompanying drawings I
have shown the invention in an embodiment
which is satisfactory, I desire it understood
that the general principles involved and the
invention is not limited to details or specific
arrangements.

Figure 1:
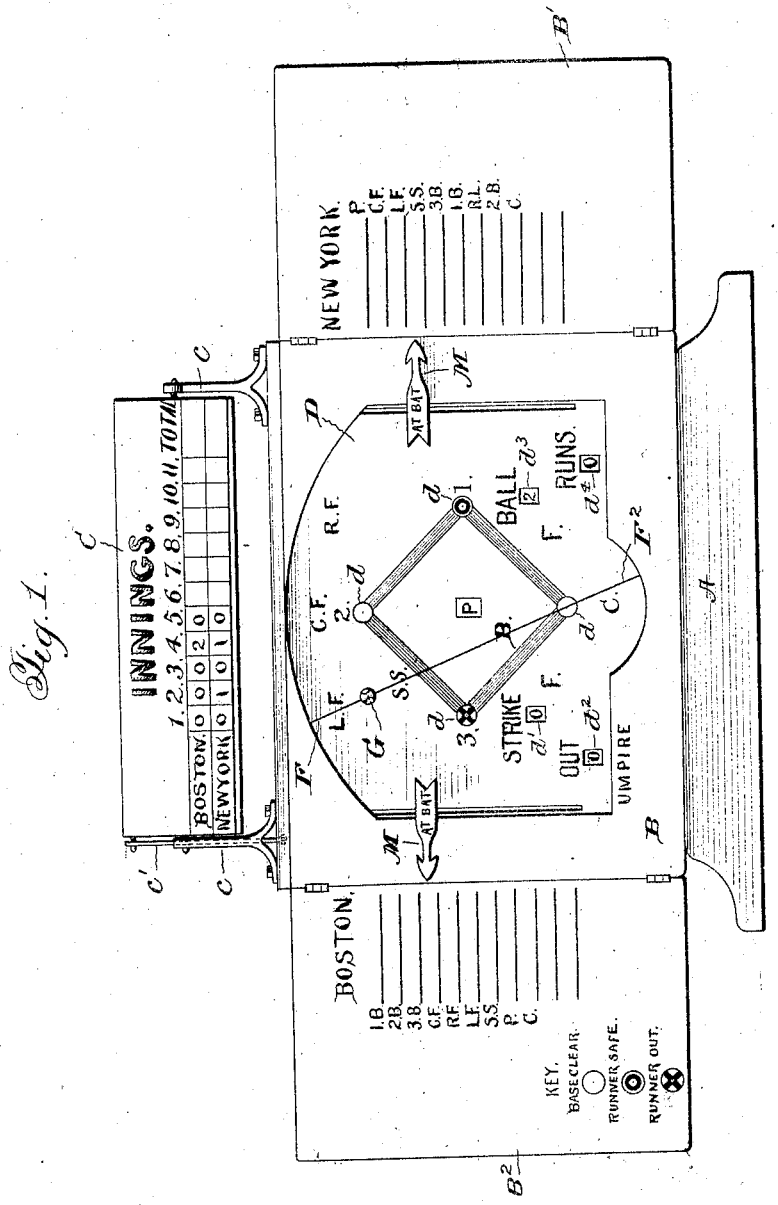
Figure 2:
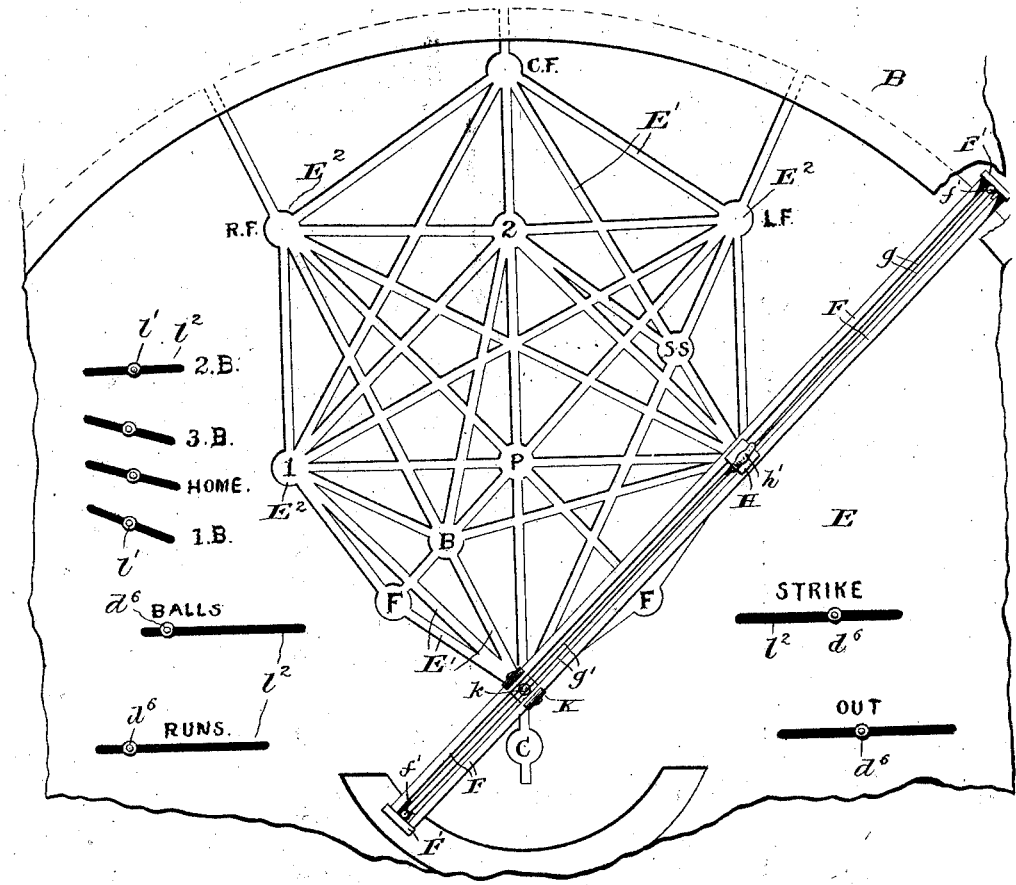
Figure 9:
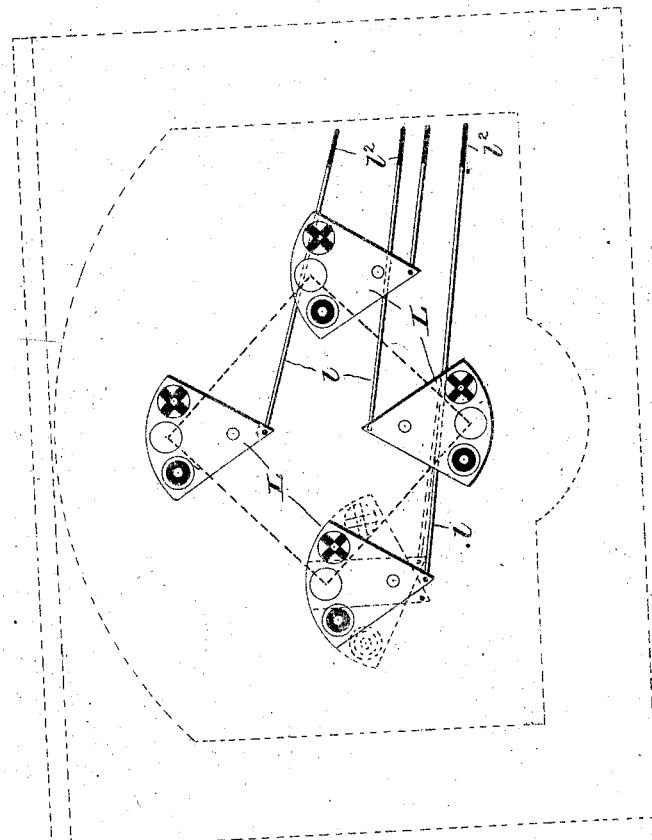

In the drawings, Figure 1 represents a
front view of the board, Fig. 2 is a rear view
of the board covering the ball field, the sur-
rounding portions being omitted, Fig. 3 is
a vertical central section of the board with
the score board at the top of the body, Fig.
4 is a perspective view of the ball or indi-
cator frame, Figs. 5, 6, 7 and 8 are detail
views of a part of the ball carrying frame,
Fig. 9 is a rear view of the base indicators,
and Fig. 10 is a detail view of the indicating
slides.

The apparatus or device is conveniently
constructed in the form of a housing having
a suitable supporting base A, a body part
B, two oppositely hinged or arranged doors,
B', B², designed to swing outward and form
side continuations of the body part. On
these boards, suitable ruling or lines are pro-
vided on which the names of the clubs and
the respective players in their order may be
placed, as indicated. Mounted on the top
of the body, is the score board C. This is
conveniently supported on two uprights $c$,
to the upper ends of which the board is cen-
trally pivoted. Any convenient means, such
as a link $c'$, connected to the score board and
the body part detachably, may be employed
for retaining the score board in its proper
position. By removing the link, the board
can be turned and the proper score placed
thereon by the operator in the rear. A sign
may be displayed, on the opposite side when
the device is otherwise not in use. The doors
B', B² may also be employed for advertising
purposes, having printed on their outer faces
suitable advertisements which are displayed
when the doors are closed.

The front of the body part B is cut away,
and back of the cut away portion is located
a field board D, on the face of which a
diamond is portrayed, in any convenient
manner, home base or "plate" being ad-
jacent the lower edge. This field board is
set back somewhat from the front of the
body part and is of sufficient size to permit
the indication of the position of all the
players in the field and diamond. It is
provided with a series of openings, such as
$d$, to indicate the respective bases and open-
ings $d'$, $d^2$, $d^3$ and $d^4$ to indicate respective
therethrough, the record of "strikes,"
"outs," "balls" and "runs." Back of these
respective last mentioned openings are ar-
ranged, in any convenient and well known
manner, slides $d^5$, Fig. 10, which may be
operated from the rear of the field board
through handles attached thereto, as shown
in Fig. 2 at $d^6$, and is also shown in Fig. 3.

Secured to the body part in the rear of
the field board is a supporting board E
spaced from the field board and of substantially the same shape and size, the same being connected fixedly at the sides, as is the field board, to the body part B. The rear face of this board E is provided with a series of channels or grooves E', which extend primarily through the home base or plate to the different parts of the field. These grooves E' also extend from the different bases to the different parts of the field and from the "pitcher" to the different bases and different parts of the field, as shown in Fig. 2, so that by the arrangement of grooves or guides, which may for convenience be termed "paths," to the various places or points in the field, the position of the ball, presently to be described, can be readily traced and placed by the operator. To indicate on the front of the field board the exact position of the ball, as it has been played at the ball grounds, I provide a frame which I mount on the supporting board and which is shown in Fig. 4 in detail. This frame consists of two upright bars F, having their opposite ends spaced apart and secured in head blocks F'. These head blocks are somewhat T-shaped, as shown in Figs. 5 and 6, the stems of which are projected forward over the top of the supporting and field boads, as shown in Fig. 3. Conveniently, the upright or supports F have their ends located in sockets formed in the heads F' and are there secured by set screws or other means. The heads are provided on their inner faces with ribs $f$ spaced apart and between the rear ends of said ribs are mounted grooved pulleys $f'$, while pulleys $f^2$ and $f^3$ are mounted between the ribs $f$ adjacent the uprights F and the outer ends of the heads. These pulleys are loosely mounted on suitable shafts $f^6$. The pulleys have grooved peripheries, as shown. $F^2$ designates a guide wire which is suspended from the extreme outer ends of the heads by being attached in any convenient manner to adjusting screws $f$ mounted in the ends of the heads. The guide wire $F^2$ passes loosely through a ball G. Connected to the upper part of the ball is a cord or wire $g$ which passes over the upper pulleys $f^2$, $f^3$ of the head F' and thence downward between the uprights F around the pulley $f'$ of the lower head and back and secured to a slidable saddle block H through a perforation in which the cord $g$ passes during its downward course. A wire or cord $g'$ similar to that of the wire or cord $g$ is secured to the lower part of the indicator ball G and passes down over the pulleys in the lower end, up through the saddle block, around the pulley $f'$ in the upper head and back to and secured to the upper part of the saddle block. The saddle block is so formed as to embrace the inner side portions of the upright F and is positioned by virtue of the lengths of the two cords $g$ and $g'$, directly opposite the indicator ball G. As the indicator ball is in front of the front face of the field board and the saddle block in the rear of the supporting board, it will be seen that it is necessary to maintain the exact relative positions of the indicator ball and saddle block. I have found that by the arrangement of cords, as above described, a movement of the saddle block in one direction will move the ball G correspondingly in the same direction. Passing through the saddle block is a stem $h$ having a handle $h'$ thereon at its outer end and on its inner end is fixedly secured an oblong runner or foot $h^2$ of a width to fit the grooves E' in the supporting board but of a length to prevent the same from turning in the groove. The grooves, as diagramed in Fig. 2, terminate in circular points $E^2$, so that runner or foot when it reaches a circle or switching point in the field, as represented by the points $F^2$ can be turned in any direction and projected into the radiating grooves from said circular switching place or point, as will be presently described.

To mount the ball supporting frame on the supporting board, I provide a yoke K, (Fig. 8) of substantially U-shape, and in the outer ends of the arms of the yoke are fixedly secured, by bolts or otherwise, the uprights F. This yoke is pivoted at $k$ to a plate $k'$ recessed into and permanently secured to the supporting board E, as shown in Fig. 3. The pivot of this yoke is arranged conveniently directly back of the home plate on the field board and adjacent the lower end of the frame. By this arrangement the long arm of the frame, comprising the bars F, will be permitted a swinging movement across the entire ball field, as displayed on the backing, and as represented by the various intersecting grooves, as shown in Fig. 2. During this movement, the ball which is suspended at the front of the field board, will likewise have a movement corresponding to the movement of the pivoted frame, so that in operation the operator grasping the handle $h'$ can direct the ball either upward or downward and into the various channels or paths, represented by the grooves or guides on the supporting board E. Should a ball be driven by the batter to the left field, the operator immediately moves the saddle block to the point indicated left field on the diagram, as represented by the grooves, and the ball at the front of the field will be positioned to correspond. The left fielder getting the ball may throw it to first base and, if so, the operator, being so advised, immediately carries the saddle block to a point opposite the first base and thereby indicating what was done with the ball. The above explanation will be sufficient to indicate the general operation of the apparatus which is, namely, the ability of the operator to place and position the indicating ball during the various plays usual on a ball field, in exact corresponding portions on the field board.

To indicate the result of a strike and the position of the batter on the bases, I have provided a series of four shutters L, Fig. 9, one each for the respective bases. These shutters are triangular in shape, having a curved base portion the radii of which is concentric with the pivot. On the base or widened portion I have arranged at the extremes a marking to indicate the player as safe, and opposite, a cross indicating that the player has been put out at that base, while between these two spots is a spot to indicate that the base is not occupied. These pivoted shutters are actuated by rods $l$ leading to one side of the supporting board and having angular pieces $l'$ leading through slots $l^2$ formed in the supporting board, as shown in Fig. 2.

The "key" to the shutters is conveniently depicted on one of the side doors, as shown in Fig. 1.

Suitable arrows M are mounted at the sides of the body to indicate the player that is "at bat." These arrows may be moved up and down in any convenient manner, or may be omitted, if desired.

From the foregoing description, it will be evident that one operator located at the back of the board can indicate to the assemblage the exact position of the ball, the various plays that are made, the result of the pitching, and the final scores, and so with but little trouble.

The arrangement of the "paths," grooves or guides on the back may be, of course, varied, but the diagrammatic arrangement, as portrayed in Fig. 2, covers substantially the entire field. In this connection, it will be observed that the line from the pitcher's box to the catcher's extends below the pivot of the swinging frame, so that the movement of the ball from the catcher to other points in the field can be rapidly indicated. I have also found it convenient to indicate foul lines outside of the diamond, and as shown, it is also advantageous to extend direct lines from the home plate to the margin of the field beyond the circles or switching points indicating the position of the right, center and left fields. This is convenient so that when the ball is driven to the border of the field, it can be indicated on the field board.

Of course, it is to be understood that the specific details can be modified and features can be added without departing from the spirit of the invention.

Having thus described the invention, what is claimed as new and desired to be secured by Letters Patent is:

1. In a base ball bulletin, the combination with a representation of a base ball field, a series of guides at the rear of the field, a pivoted frame at the rear of the field adjacent the guides, a movable indicator at the front of the field, a member slidably mounted on the frame, and connections between said slidable member and indicator for adjusting the same, substantially as described.

2. In a base ball bulletin, the combination with a field board, of a swinging carrying member at the rear thereof projecting above and below the same, a movable indicator at the front of the field, an indicator adjusting device movably supported on the swinging member, and connections between the movable indicator and said adjusting device, whereby the movement of one member causes a corresponding movement of the other member in the same direction.

3. In a base ball bulletin, the combination with a field board, of an indicator in front thereof, an indicator adjusting device at the rear, and flexible connections between said adjusting device and said indicator extending beyond the board arranged to move lengthwise to cause a movement in the same direction of the indicator and adjusting device.

4. In a base ball bulletin, the combination with a field board, of a swinging frame having projections at opposite ends extending forwardly, a guide secured to said projections, an indicator mounted on said guide, an adjusting device on the frame, and flexible connections between said adjusting device and said indicator, for the purposes described.

5. In a base ball bulletin, the combination with a field board, of a pivoted frame in rear thereof, an adjustable device supported by the frame, an indicator arranged in front of the field, and flexible connections between the indicator and the adjustable device comprising flexible connections extending in opposite directions from the indicator and connected to the said adjusting device.

6. In a base ball bulletin, the combination with a field, of a swinging arm pivoted in the rear of the field, a series of guides in the rear of the field extending to different points corresponding to different points on the field, a movable device on the arm, means on said device for engaging the guides, an indicator at the front of the field, and means for connecting the indicator with the said movable device, substantially as described.

7. In a base ball bulletin, the combination with a field, of an indicator adjacent the field, a swinging frame in the rear of the field, projections on the frame extending forwardly beyond the plane of the field, a guide on the projections, an indicator ball on the guide, a ball adjusting device on the swinging frame, a flexible connection extending from the ball to the frame, a series of guides at the rear of the field, and means on the adjusting device for operating the said flexible connection and moving the indicator on the field.

8. In a base ball bulletin, the combination with a field, of a swinging supporting frame, a sliding saddle carried by the frame, an indicator such as a ball, positioned in front of the field, pulleys carried by the swinging frame at opposite ends, a cord extending from the ball over the said pulleys downward to a pulley in the opposite end of the frame and back to the said saddle, and a similar cord extending in the opposite direction passing over the said pulleys at the lower end of the frame, over a pulley in the upper end of the frame, and back to the saddle, substantially as described.

9. In a base ball bulletin, the combination with a field, of an indicator supporting frame comprising bars, a sliding saddle carried by the bars, an indicator such as a ball, positioned in front of the field, pulleys carried by the swinging frame at opposite ends, a cord extending from the ball over the said pulleys downward to a pulley in the opposite end of the frame and back to the said saddle, a similar cord extending in the opposite direction passing over the said pulleys, the lower end of the frame, over a pulley in the upper end of the frame, and back to the saddle, guiding grooves, and means on the saddle coöperating with the grooves.

10. In a base ball bulletin, the combination with a field, of an indicator supporting frame comprising bars, a sliding saddle carried by the bars, an indicator such as a ball, positioned in front of the field, pulleys carried by the swinging frame at opposite ends, a cord extending from the ball over the said pulleys downward to a pulley in the opposite end of the frame and back to the said saddle, a similar cord extending in the opposite direction passing over the said pulleys, the lower end of the frame, over a pulley in the upper end of the frame, and back to the saddle, guiding grooves, and a pivoted shoe on the saddle coöperating with the grooves.

11. In a base ball bulletin, the combination with a field, of an indicator adjacent the front thereof, means for adjusting the indicator comprising a movable member at the rear of the field, a series of guides in the rear of the field extending in different directions corresponding to different points on the field, and a pivoted runner or shoe on said member engaging the sides of said guides, for the purposes specified.

12. In a base ball bulletin, the combination with a field, of means for positioning a ball relative to the field, comprising means extending outwardly beyond the edge of the field to the rear thereof, a series of guide grooves at the rear of the field, and means connected with said extending means and movable in said grooves for properly positioning the ball relative to the different points on the field.

13. In a bulletin, a movable indicator at the face thereof, means for adjusting the indicator comprising flexible means extending in opposite directions from the indicator to the edge of the face, an adjusting device connected to said means, and guiding surfaces engaging with said adjusting device and arranged in the rear of said face, for positively directing the movement of the adjusting device, substantially as described.

14. In a device of the character described, a carrying frame, comprising head blocks, bars connected to the head blocks, a saddle movable between the bars, a pivotal support for the frame, an indicator carried by the heads, and flexible connections between the indicator and the saddle, for the purposes specified.

15. In a device of the character described, the combination with a pivoted frame carrying an indicator and comprising heads having pulleys therein, a movable block in the frame, a connection between the indicator and the block, and a member on the frame having means for pivotally connecting it to a support.

16. In a device of the character described, the combination with a supporting member, of a yoke pivoted thereon, two bars secured to the outer ends of the yoke, heads carried by the bars, an indicator, a guiding connection between the indicator and the heads, a movable device between the bars and flexible connections between said movable device and said indicator.

17. In a device of the character described, an indicator frame comprising parallel bars, a movable block between the bars, a pivotal support connected with the bars, heads on the bars, pulleys on the heads, an indicator arranged between the ends of the heads, and cords connected with the indicator passing in opposite directions from one head to the opposite head, and thence to and connected with the said block.

18. In a device of the character described, a swinging frame, a support therefor, a series of guide-grooves on the support, a movable block in the frame, an adjustable member carried by the block and carrying a runner or shoe on its inner end coöperating with the guide grooves, and an indicator carried by the frame and connected with said block, substantially as described.

19. In a device of the character described, a swinging frame carrying an indicator, of a support for the frame comprising a substantially U-shaped member, connections between the outer end of the arms of the said member for securing it to the frame, and a pivot at the base of the said U-shaped member.

20. In a base ball bulletin, the combination with a body, and a field board, an indicator with means for operating the indicator, of a score board, means for supporting the score board mounted on the body and pivoted connections between said means and score board, and means for retaining the score board in proper position of adjustment.

21. In a base ball bulletin, the combination with a body, of a field board, an indicator, means for operating the indicator for indicating the position of the ball on the field, hinged bars at the sides of the body, and having thereon a list of players, or the like.

22. In a bulletin of the character described, the combination with a field board, of a movable arm having projections at opposite ends, extending forwardly, a guide secured to said projections, an indicator mounted on said guide, an adjusting device on the arm, and flexible connections between said adjusting device and said indicator.

23. In an apparatus of the character described the combination with a field, of a movable arm mounted to the rear of the field, a series of guides to the rear of the field extending to different points, corresponding to different points on the field, a movable device on the arm, means on said device for engaging the guides, an indicator at the front of the field, and means for connecting the indicator with the said movable device.

24. In a bulletin of the character described, the combination of a field surface, a guide extending over the field surface, an indicator slidably mounted on the guide, and means to the rear of the field surface for operating the indicator.

25. In a bulletin board of the character described, the combination of a field surface, a movable guide extending over the field surface, an indicator movably supported on the guide, and means to the rear of the field surface for moving the indicator relative to the guide.

26. In a bulletin board of the character described, the combination of a field surface, a movable guide extending over the field surface, an indicator sleeved on the guide for relative sliding movement, and means for moving the indicator on said guide.

27. A game bulletin board, including a ball field representation on the board, an indicator adapted to play over the field, a guide for the indicator extending across the board, the indicator being slidably mounted on said guide, means for moving the guide and flexible means extending across the board for moving the indicator on said guide.

28. In an apparatus of the class described, in combination, a surface provided with a field, a flexible member stretched across said field, an indicating member connected to the flexible member, and pivoted swinging means carrying the flexible member, and on which the same can be moved for endwise adjustment whereby said indicator can be moved to any part of the field.

29. In an apparatus of the class described, the combination of a wall provided with a suitable field, a swinging pivoted carrier, a member extended across said field and supported by said carrier, and an indicating device supported by said extended member, said extended member being movable independently of the movement or position of the carrier.

30. In an apparatus of the class stated, the combination of a wall having a field representation thereon, an indicator to move over the field, a rigid frame pivotally supported at the rear of the field, an operating device movably mounted on the frame, and a flexible connection between the operating device and indicator.

31. In an apparatus of the class described, the combination of a board having a field representation, an indicator to move over the field, an elongated runway pivotally mounted upon the rear of the board, an operating device slidably mounted on the runway, and an operative connection between the operating device and indicator.

32. In an apparatus of the class described, the combination of a board having a field representation, an indicator to move over the field, an elongated runway pivotally mounted upon the rear of the board, an operating device slidably mounted on the runway, and a flexible cord connection between the operating device and indicator.

33. In a ball bulletin board, the combination of a board having a field representation on the front surface thereof, an indicator to move over the field, a lengthwise movable flexible support connected to the indicator and projecting beyond the bounds of the field and to the rear of the board, an adjusting device at the rear of the board for moving the flexible member lengthwise, and means whereby said adjusting device and indicator move in the same direction at all times.

34. In a base ball bulletin, the combination of a supporting body, a field board, an indicator, means for operating the indicator for indicating the position of the ball on the field, and pivotally connected auxiliary boards at the sides of the field board adapted to support the auxiliary indicating data.

35. In a base ball bulletin, the combination with a body, and a field board, an indicator with means for operating the indicator, of a score board, means for supporting the score board mounted on the body, and pivoted connections between said means and score board.

36. In a base ball bulletin board, the combination with a board having a field representation, an indicator to move over the field representation, an elongated arm pivoted to the rear of the board at a point adjacent the home plate representation on the front of the board, and an operating device carried by said elongated member and operatively connected with the indicator.

37. In a ball bulletin board, the combination of a wall having a field representation on the front surface thereof, and means to indicate the movement of a ball thereover, of an auxiliary wall at opposite sides of the first mentioned wall, said auxiliary walls being mounted for pivotal movement, and adapted to have thereon the names of the players or the like.

38. In a ball bulletin board, the combination of a wall having a field representation on the front surface thereof, and means to indicate the movement of a ball thereover, of an auxiliary wall at opposite sides of the first mentioned wall, said auxiliary walls being mounted for pivotal movement, and to have thereon certain indicating data, and movable indicators to move relative to said auxiliary walls.

In testimony whereof I affix my signature in presence of two witnesses.

GEORGE HENRY PARKER.

Witnesses:
 JOHN R. PRICE,
 WM. KOENIG.